(12) United States Patent
Hoffmann et al.

(10) Patent No.: US 9,897,070 B2
(45) Date of Patent: Feb. 20, 2018

(54) REAR CASING, ROTOR BLADE WITH REAR CASING, AND A WIND TURBINE THAT COMPRISES SUCH A ROTOR BLADE

(71) Applicant: WOBBEN PROPERTIES GMBH, Aurich (DE)

(72) Inventors: Alexander Hoffmann, Emden (DE); Johannes Kannenberg, Aurich (DE); Laurence Baker, Aurich (DE); Falk Spieth, Aurich (DE)

(73) Assignee: Wobben Properties GmbH, Aurich (DE)

( * ) Notice: Subject to any disclaimer, the term of this patent is extended or adjusted under 35 U.S.C. 154(b) by 629 days.

(21) Appl. No.: 14/362,558

(22) PCT Filed: Nov. 30, 2012

(86) PCT No.: PCT/EP2012/074041
§ 371 (c)(1),
(2) Date: Jun. 3, 2014

(87) PCT Pub. No.: WO2013/083481
PCT Pub. Date: Jun. 13, 2013

(65) Prior Publication Data
US 2014/0328691 A1 Nov. 6, 2014

(30) Foreign Application Priority Data

Dec. 8, 2011 (DE) .................. 10 2011 088 048
Jun. 13, 2012 (DE) .................. 10 2012 209 935

(51) Int. Cl.
*F03D 1/06* (2006.01)
*F03D 11/04* (2006.01)
*F03D 13/40* (2016.01)

(52) U.S. Cl.
CPC ......... *F03D 1/0658* (2013.01); *F03D 1/0641* (2013.01); *F03D 1/0675* (2013.01);
(Continued)

(58) Field of Classification Search
CPC ... Y02E 10/721; F03D 1/0641; F03D 1/0675; F03D 1/0683; F03D 1/065; F03D 1/001;
(Continued)

(56) References Cited

U.S. PATENT DOCUMENTS 2,485,543 A * 10/1949 Andreau ............... F03D 15/05
290/52
3,365,173 A * 1/1968 Lynch .................. F01D 9/042
415/209.2

(Continued)

FOREIGN PATENT DOCUMENTS

CN 102112733 A 6/2011
DE 20 2011 103 091 U1 11/2011
(Continued)

*Primary Examiner* — Woody Lee, Jr.
*Assistant Examiner* — Joshua R Beebe
(74) *Attorney, Agent, or Firm* — Seed Intellectual Property Law Group LLP (57) ABSTRACT

The invention concerns a rear box section for a rotor blade, in particular of a wind power installation, comprising a pressure-side surface, a suction-side surface, a trailing edge separating the pressure-side and suction-side surfaces, and a connecting side which is opposite to the trailing edge and which is adapted for mounting to a corresponding connecting surface of the rotor blade. The invention concerns in particular a rear box section which is sub-divided into a foot segment having the connecting side and one or more head segments which have the trailing edge and which can be coupled to the foot segment. The invention also concerns a rotor blade for a wind power installation, and a wind power installation.

22 Claims, 11 Drawing Sheets

(52) U.S. Cl.
CPC .......... *F03D 1/0683* (2013.01); *F03D 13/40* (2016.05); *F05B 2230/60* (2013.01); *F05B 2240/30* (2013.01); *F05B 2240/302* (2013.01); *F05B 2260/30* (2013.01); *Y02E 10/721* (2013.01); *Y02P 70/523* (2015.11)

(58) Field of Classification Search
CPC ........ F03D 7/0232; F03D 13/40; F03D 11/04; F03D 1/0658; F03D 1/06; F05B 2230/60; F05B 2240/302; F05B 2260/30; F05B 2240/30; Y02P 70/523
See application file for complete search history.

(56) References Cited

U.S. PATENT DOCUMENTS

| | | | | |
|---|---|---|---|---|
| 3,487,879 | A * | 1/1970 | McCarthy | F04D 29/324 416/220 A |
| 4,618,313 | A * | 10/1986 | Mosiewicz | B64C 11/18 416/23 |
| 5,320,491 | A * | 6/1994 | Coleman | F03D 7/0252 244/213 |
| 5,580,219 | A * | 12/1996 | Frey | F01D 5/3084 416/217 |
| 6,422,820 | B1 * | 7/2002 | Anderson | F01D 5/3053 29/889.21 |
| 6,830,436 | B2 * | 12/2004 | Shibata | F03D 1/0641 416/228 |
| 7,578,654 | B2 * | 8/2009 | Lorin De La Grandmaison | B64C 27/615 416/23 |
| 7,798,780 | B2 * | 9/2010 | Bakhuis | F03D 1/0675 416/223 R |
| 7,909,576 | B1 * | 3/2011 | van der Bos | F03D 1/0675 416/146 R |
| 7,914,261 | B2 | 3/2011 | Wobben | |
| 8,317,479 | B2 | 11/2012 | Vronsky et al. | |
| 2007/0025858 | A1 * | 2/2007 | Driver | F03D 1/065 416/229 R |
| 2007/0036657 | A1 * | 2/2007 | Wobben | F03D 1/0641 416/223 R |
| 2008/0206062 | A1 * | 8/2008 | Sanz Pascual | F03D 1/0675 416/226 |
| 2009/0028705 | A1 * | 1/2009 | Meldgaard | F03D 1/0675 416/23 |
| 2009/0290982 | A1 * | 11/2009 | Madsen | F03D 1/0633 416/61 |
| 2009/0311106 | A1 * | 12/2009 | Rohden | F03D 1/0675 416/241 A |
| 2010/0028161 | A1 * | 2/2010 | Vronsky | F03D 1/0641 416/238 |
| 2010/0071400 | A1 * | 3/2010 | Feinauer | F25C 1/225 62/340 |
| 2010/0143146 | A1 * | 6/2010 | Bell | F03D 1/06 416/233 |
| 2011/0142668 | A1 | 6/2011 | Rao | |

FOREIGN PATENT DOCUMENTS

| | | | |
|---|---|---|---|
| EP | 1 514 023 A1 | 3/2005 | |
| GB | 2 062 120 A | 5/2017 | |
| RU | 2076239 C1 | 3/1997 | |
| RU | 2211366 C1 | 8/2003 | |
| RU | 2392486 C1 | 6/2010 | |
| WO | 03/104646 A1 | 12/2003 | |
| WO | 2008/052677 A2 | 5/2008 | |
| WO | WO 2010016125 A1 * | 2/2010 | .......... F03D 1/0608 |
| WO | WO 2010043645 A2 * | 4/2010 | .......... F03D 1/0641 |
| WO | 2011/088835 A2 | 7/2011 | |

* cited by examiner

REAR CASING, ROTOR BLADE WITH REAR CASING, AND A WIND TURBINE THAT COMPRISES SUCH A ROTOR BLADE

BACKGROUND

Technical Field

The present invention concerns a rear box section for a rotor blade, in particular of a wind power installation, comprising a pressure-side surface, a suction-side surface, a trailing edge separating the pressure-side and suction-side surfaces, and a connecting side which is opposite to the trailing edge and which is adapted for mounting to a corresponding connecting surface of the rotor blade.

The invention further concerns a rotor blade for a wind power installation, comprising a supporting portion, a rotor blade root embraced by the supporting portion for mounting to a rotor of a wind power installation, a pressure-side blade surface, a suction-side blade surface and a trailing edge separating the pressure-side and the suction-side surfaces. The invention also concerns a wind power installation.

Description of the Related Art

Wind power installations are becoming increasingly used because of the increased endeavors in the field of power generation from regenerative energy sources.

In that respect, new ways of making wind power installations more powerful and more efficient are constantly being sought.

For example wind power installations are known which, as a departure from traditional rotor blade shapes, use rotor blades with adaptable blade surfaces. In that case the maximum profile width of the rotor blade, that is to say the length of the chord between the trailing edge and the foremost point of the rotor blade nose in cross-section assumes its maximum value not in a central region of the rotor blade but very close to the end region of the rotor blade on the side of the rotor hub. That achieved a marked increase in efficiency, contrary to long-standing prejudices in the industry. A wind power installation with such a rotor blade is known for example from EP 1 514 023 B1.

That hub-side enlargement of the surface of the rotor blade is ensured by mounting a rear box section to the rotor blade, which in turn also has a trailing edge oriented in alignment with the trailing edge of the rotor blade when the rear box section is mounted on the rotor blade.

Particularly in the case of larger wind power installations with pylon heights of above 80 m in accordance with the state of the art however the problem arises that the rotor blades with corresponding rear box section are of such a large profile width that they can be transported only with major complication and expenditure.

BRIEF SUMMARY

One or more embodiments are directed to a rear box section that can be transported to the erection location separately from the rotor blade and there mounted to the rotor blade. That gives rise to additional logistical and time constraints.

One embodiment of the present invention is to provide a rear box section, a rotor blade and a wind power installation. A rear box section according to one embodiment is sub-divided into a foot segment having the connecting side and one or more head segments which have the trailing edge and which can be coupled to the foot segment. This embodiment makes use of the realization that a substantial time saving and improvement in quality can be achieved if all those working or production steps which are linked to high level of complication and expenditure, for example because they require a high degree of manufacturing precision, should as far as possible not be carried out at the erection location, but already in the factory. A step which requires a high degree of manufacturing or assembly precision is that of connecting the connecting side of the rear box section to the connecting surface of the rotor blade. That is primarily because of the curvature or curve configuration of the pressure-side and suction-side surface edges on the connecting side of the rear box section. Because the rear box section designed is sub-divided into foot segment and one or more head segments, the rear box section makes it possible to fit the foot segment as from the factory. By virtue of the couplable configuration of the foot segment and the head segment or segments, subsequent mounting of the head segment or segments on the foot segment is possible selectively as from the factory or at the location of erection. The coupling which is already implemented upon production of the rear box section achieves a marked saving in time and costs when the head segment or segments is or are subsequently fitted in place at the erection location, while at the same time a further increase in efficiency is optionally possible by previously fitting the foot segment to the rotor blade.

An advantageous development of one embodiment of the invention provides that the foot segment has for each head segment a separate sub-division plane in which the head segment or segments can be coupled to the foot segment. The provision of separate sub-division planes for each head segment simplifies the association with a region of the foot segment, the region having the respective sub-division plane.

In an alternative advantageous embodiment the foot segment has for a plurality of or all head segments a continuous sub-division plane in which the respective head segments can be coupled to the foot segment. A sub-division plane which extends over a plurality or all association regions between the foot segment and the head segments affords the advantage that a plurality of segments can be coupled to the foot segment in succession on the common sub-division plane and in that case bear against each other. That markedly reduces the complication and expenditure involved in fixing the position of the plurality of head segments.

In a further preferred embodiment of the invention the one or more sub-division planes are so arranged that the maximum profile width of the rotor blade is 4 m or less when the foot segment is connected to the rotor blade. Because a length division is selected, that leads to a maximum profile width in the above-mentioned range, the transportability of the rotor blade together with previously mounted foot segment of the rear box section is markedly improved.

The sub-division planes are preferably oriented substantially in the longitudinal direction of the rotor blade axis. Preferably an angle in a region of 30° or less is defined between the rotor blade axis and the sub-division plane or planes.

In a further preferred embodiment the foot segment and the head segment or segments can be coupled together in positively locking relationship.

In a particularly preferred embodiment of the rear box section the positively locking coupling between the foot segment and the head segment or segments is preferably effected by means of a hinge-like connection.

Preferably in that case the foot segment for positively locking the coupling has a plurality of mutually spaced projections with a first recess and the head segment or segments respectively have a plurality of mutually spaced projections with a second recess, wherein the projections of the foot segment and the projections of the head segment or segments can be oriented in mutually aligned relationship. In that respect in aligned relationship is used to mean in relation to the center points of the mutually facing ends of the first and second recesses and in that case the spacings are preferably so selected that a projection of the foot segment can engage into the spacing between two adjacent projections of the head segment or segments and vice-versa. A projection on the head segment or segments can accordingly engage into the spacing between two adjacent projections on the foot segment.

The advantage of such a hinge-like coupling of the foot segment to the head segment or segments is in particular that orientation of the parts relative to each other is very simple and is made possible for connecting a plurality of successively arranged projections, that are oriented towards each other, with recesses, by means of a single connecting member which can be in the manner of a hinge pin.

The rear box section according to the above-described embodiment is advantageously developed by an elongate body whose cross-section is adapted to the cross-section of the first and second recesses and which can be introduced into the plurality of first and second recesses when they are oriented in substantially mutually aligned relationship. Preferably the diameter of the first recesses is substantially equal to the diameter of the second ones. Particularly preferably the diameter of the elongate body is so adapted to the diameter of the first and second recesses that it is accommodated in play-free relationship or as substantially play-free as possible in the first and second recesses. The more precise the fit between the elongate body and the recesses, the correspondingly less is the motional play between the head segment or segments and the foot segment, and that overall has a positive effect on the stability of the rotor blade.

In a further preferred embodiment of the rear box section the elongate body is of such a configuration that in the mounted condition it extends through the plurality of projections of the foot segment and the head segment or segments. That provides a connection similar to that of a continuous hinge or piano hinge.

Preferably the elongate body comprises a fiber composite material, in particular glass fiber-reinforced plastic. The advantage of a corresponding elongate body is that the elongate body has a certain elasticity which makes it possible for the elongate body to be deformed along a curved path and also to be passed through such projections which are not oriented in strictly coaxial relationship with each other in respect of their recesses but are arranged along a curved path.

Preferably the rear box section is of such a configuration that the projections of the foot segment and of the head segment or segments are arranged along a curved path. Particularly preferably the curvature of the path corresponds to the contour configuration of the rotor blade. In combination with an elastic elongate body, that means that the positively locking connection can be arranged directly at the outer edge of the adjacent segments, that is to say the foot segment and the head segment or segments, for example directly at the wall thereof. The curvature configuration afforded by the curvature of the wall is the contour configuration of the rotor blade and ensures at the same time that a pivotal movement between the foot segment and the head segment or segments, which is normally allowed in the case of a hinge, is prevented as a result of the curvature. That further enhances the stability of the rotor blade.

In a further preferred embodiment the wall of the first and second recesses is lined portion-wise or completely with a plastic. Preferably in that respect polyethylene is used as the plastic. Particularly preferably the lining on the wall of the first and second recesses is in the form of a hollow cylinder which is enclosed externally by a layer of a material which is firmer in comparison with the material of the hollow cylinder, for example a layer of glass fiber-reinforced plastic. That improves the way in which the pressure forces are carried by the projections.

In a further preferred embodiment of the rear box section the projections are in the form of straps and preferably have a fabric or sheet comprising two or more fiber composite material layers. Depending on the respective dimensioning of the rotor blade and depending on the respective size of the wind forces to be expected as acting thereon the projections must withstand different tensile and pressure loadings. The dimensioning of the rotor blade and the rear box section can be taken into account by a suitable thickness for the fabric sheet.

In addition the projections preferably have a foam body enclosed by the fabric sheet. In a first preferred alternative the foam wedge is made from an elastic foam. That has the advantage that any pressure forces acting on the projections which are in the form of straps can be damped. In a second alternative the foam wedge is made from a non-elastic, in particular hardened foam. That has the advantage that the stiffness of the projections which are in the form of straps is further increased.

Particularly preferably the foot segment for positively locking coupling has one or more rails and the head segment or segments has or have one or more corresponding rails, wherein the rails can be brought into engagement with each other, preferably by being pushed on. It has been found that the use of a rail system which provides for the production of a positively locking connection by being pushed on represents a particularly good compromise between positioning accuracy and handleability, this being promoted by that kind of positively locking coupling between the foot segment and the head segment at the location at which a wind power installation is erected.

In an advantageous development a respective rail on the foot segment or the corresponding rail of the associated head segment have a dovetail profile. Such positively locking connections with dovetail profiles and recesses of a corresponding configuration involving engagement therebehind guarantee a high degree of positioning accuracy. Optionally it is possible to arrange a respective individual rail with corresponding part for head and foot segment or it is possible to arrange a respective plurality of rails parallel.

In a particularly preferred alternative the rail or rails on the foot segment or the corresponding rail or rails of the head segment or segments are identical. Preferably they are of a substantially L-shaped cross-section. That makes it possible for identical rail elements produced with a single tool to be arranged both on the part of the foot segment and also correspondingly on the part of the head segment or segments, which can be brought into mutual engagement. When using such identical rail elements it is particularly preferred for two rails to be associated with the foot segment for each head segment, and for two corresponding rails to be respectively associated with the respective head segment. The rails are preferably oriented parallel to each other.

In a further preferred embodiment of the invention at least two, preferably three or four, head segments are associated with the foot segment.

In a preferred embodiment one or more head segments of a respective length of 3 m or less are associated with the foot segment. For the preferred embodiment with a plurality of head segments, that affords the following advantage, described by means of the example having three head segments per foot segment. With a respectively identical length (in the longitudinal direction) of the head segments, the head segment which is largest transversely relative to the longitudinal direction and the head segment which is smallest transversely relative to the longitudinal direction can be stacked one within the other. In that way it is possible for those two respective head segments to be loaded fitted one into the other internally on one side of a closed 40'-container, with the other central head segment being loaded on the other side of the container. Thus preferably three of the groups arranged as hereinbefore of head segments can be arranged in succession in the longitudinal direction in the 40'-container. In that way all head segments required for a wind power installation having three rotor blades can be advantageously transported in a compact arrangement. That advantage is also similarly enjoyed for other longitudinal divisions and other associations of head segment per foot segment.

Preferably two rails which are guided parallel are associated with the foot segment for each head segment and each head segment has two corresponding rails guided parallel for being brought into engagement with the rails of the foot segment.

A preferred development of the rear box section provides that at the connecting side the pressure-side surface and the suction-side surface are respectively delimited by an edge whose respective edge configuration is adapted to the contour of the connecting surface of a rotor blade. In that way the rear box section fits closely to the rotor blade in optimum and seamless fashion.

One or more regions for the application of bonding agents, preferably adhesive such as for example a high-strength epoxy resin join are prepared in the interior of the rear box section. That makes it possible for the rear box section to be glued to the connecting surface of the rotor blade. Optionally or alternatively the regions of the edges on the connecting side of the rear box section are prepared for the application of the bonding agent. A significant cost saving is achieved by gluing the rear box section to the rotor blade, in comparison with the screwing or riveting join in conventional rotor blades. The cost saving results in particular from the fact that on the one hand the considerable material costs for screws, nuts, rivets and so forth can be saved while on the other hand the introduction of reinforcing elements only has to be implemented to a reduced degree, if at all. With conventional kinds of join a plurality of bores had to be provided, which each in itself involves a structural weakening which has to be compensated by means of reinforcements, additional structures and the like. That can now be eliminated.

Gluing the rear box section to the rotor blade is made possible with a sufficient degree of accuracy by the capability of sub-division because it is no longer necessary for the entire rear box section to be fitted at the erection location. In addition transportation of the necessary apparatus implementation for producing a precise and sufficiently durable adhesive join is eliminated.

Preferably the foot segment and/or the head segment or segments have in the region of the sub-division a respective leg extending from the pressure-side surface to the suction-side surface, wherein the rail or rails are respectively arranged on the legs. Thus the legs serve on the one hand for closing off the inside surfaces of the foot segment and the head segments, being selectively completely closed or partially opened, and in addition perform a stabilizing function. The rails can be pre-mounted on the legs so that it is actually only still necessary at the erection location to perform the operation of purely pushing the head segment or segments on to the foot segment or coupling them together.

In a further preferred embodiment the rear box section has arresting means which are provided for selectively locking or releasing the relative position between the foot segment and the at least one head segment in the coupled condition. The arresting means are preferably in the form of a bolt connection, particularly preferably in the form of a shearing bolt connection. In those embodiments of the invention which have a plurality of head segments, preferably only that of the rotor blade root is arrested at the most closely adjacent head segment. Because the head segments preferably bear against each other, the arrested head segment which is closest to the rotor blade root serves simultaneously for arresting the other head segments. In a rotor blade of the kind set forth in the opening part of this specification, there is provided a foot segment of a rear box section in accordance with one of the preferred embodiments described hereinbefore is mounted to the rotor blade.

In addition a rotor blade of the above-specified kind, in which the foot segment is coupled to one or more head segments in such a way that a rear box section according to one of the above-described preferred embodiments is provided on the rotor blade.

In addition in a wind power installation comprising a pylon, a pod, a rotor and at least one rotor blade connected to the rotor, the rotor blade is designed in accordance with one of the above-described preferred embodiments of the invention.

BRIEF DESCRIPTION OF THE SEVERAL VIEWS OF THE DRAWINGS

The invention is described in greater detail hereinafter by means of preferred embodiments by way of example and with reference to the accompany Figures in which.

DETAILED DESCRIPTION

Although certain features of preferred embodiments are described only in relation to individual embodiments, the invention also extends to the combination of individual features of the different embodiments with each other.

Figure 1:
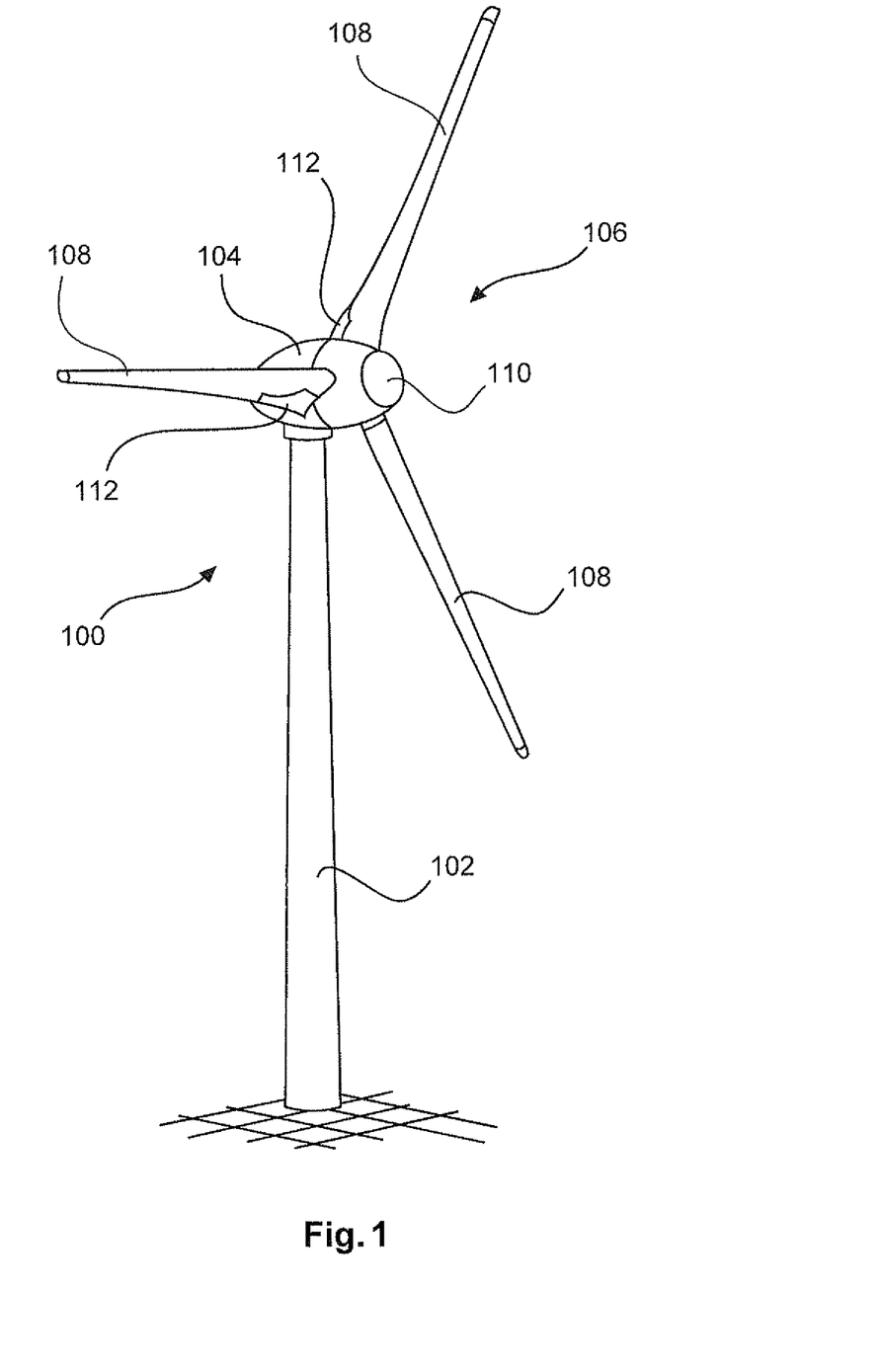
FIG. 1 shows a wind power installation according to the present invention.
Figure 2:
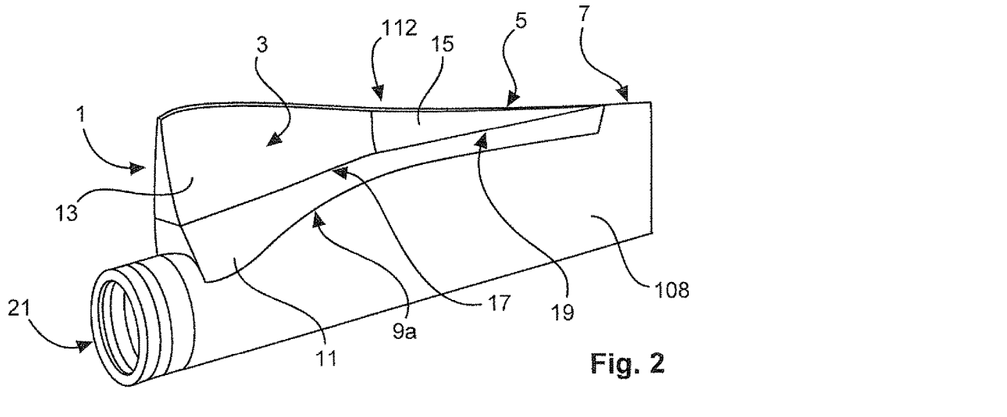
FIG. 2 shows a portion of a rotor blade according to the present invention in a first embodiment in a first mounted condition.
Figure 3:
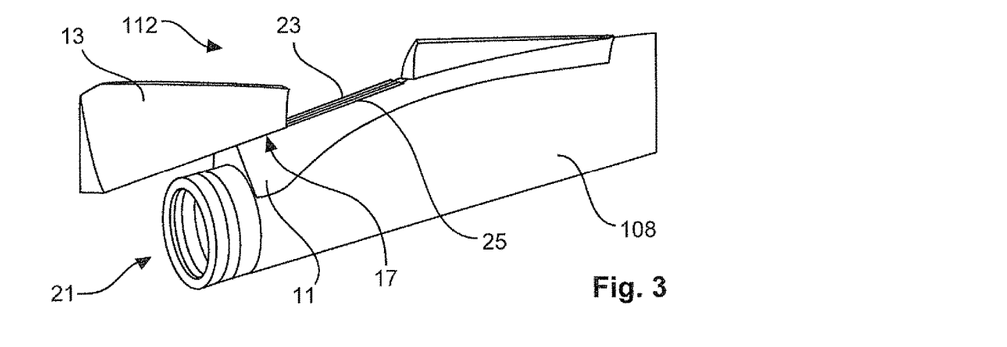
FIG. 3 shows the portion of the rotor blade of FIG. 2 in a second mounted position.

FIG. 1 shows a wind power installation 100 comprising a pylon 102 and pod 104. Arranged on the pod 104 is a rotor 106 having three rotor blades 103 and a spinner 110. In operation the rotor 106 is driven in rotation by the wind and thereby drives a generator (not shown) in the pod 104.

The rotor blades 108 each have a rear box section 112, by means of which they are in the form of adaptable rotor blades. The rear box section is sub-divided into a plurality of segments, as can be seen from FIGS. 2 to 11 hereinafter.

A rotor blade with a rear box section according to a first embodiment of the invention is shown in FIGS. 2 to 5. The rotor blade shown in FIGS. 2 to 5 has the rear box section 112 in a region adjoining the rotor blade root 21. The rear box section 112 has a suction-side surface 1, a pressure-side surface 3 and a trailing edge 5 separating the pressure-side and the suction-side surfaces 1, 3. Arranged opposite the trailing edge 5 is the connecting side of the rear box section 112 in relation to the rotor blade 108. Extending at the connecting side are a first edge 9a and a second edge 9b (see FIG. 5) which delimit the surfaces 1,3 of the rear box section 112 and are adapted to the curvature of the rotor blade 108. In the mounted condition the trailing edge 5 of the rear box section 112 is aligned with the trailing edge 7 of the rotor blade 108 and blends fluidly into same.

The rear box section 112 has a foot segment 11 having the connecting side. The rear box section 112 is sub-divided and in the embodiment shown in FIGS. 2 to 5 has a first head segment 13 and a second head segment 15. The first head segment 13 and the second head segment 15 each have a part of the trailing edge 5. The head segment 13 is coupled to the foot segment 11 in a first sub-division plane 17 while the second head segment 15 is coupled to the foot segment 11 in a second sub-division plane 19. The first and second sub-division planes 17,19 are slightly angled relative to each other.

As can be seen from FIGS. 2 to 5, provided in the region of the sub-division planes 17, 19 are rails for positively lockingly coupling the respective head segment to the foot segment. Arranged on the first sub-division plane 17 two rails 23, 25 which are guided in parallel and which are adapted for interengagement with correspondingly provided rails (not shown) in the head segment 13. Arranged on the second sub-division plane 19 are two parallel rails 27, 29 adapted for inter-engagement with corresponding rails (not shown) in the head segment 15. As can be seen from FIG. 5 the rails 27, 29 in the second sub-division plane 19 are arranged at a closer spacing relative to each other than the rails 23, 25 in the first sub-division plane 17. In that way, the available space conditions are fully utilized to ensure the highest possible stability for each of the head segments 13, 15. As can also be seen from FIG. 5, there are respective legs 31, 33 for fixing the rails 23, 25 and 27, 29 respectively, in the sub-division planes, which legs 31, 33 at least partially and in the illustrated embodiment completely close the foot segment 11.

Figure 4:
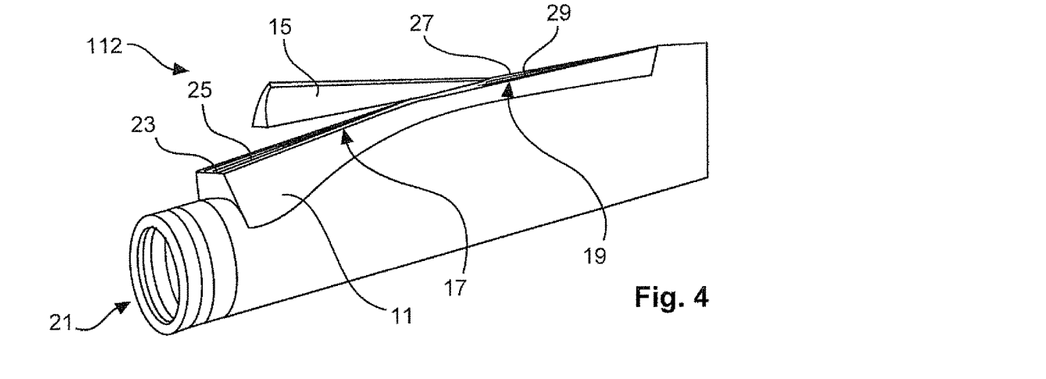
FIG. 4 shows the portion of the rotor blade of FIGS. 2 and 3 in a third mounted position.
Figure 5:
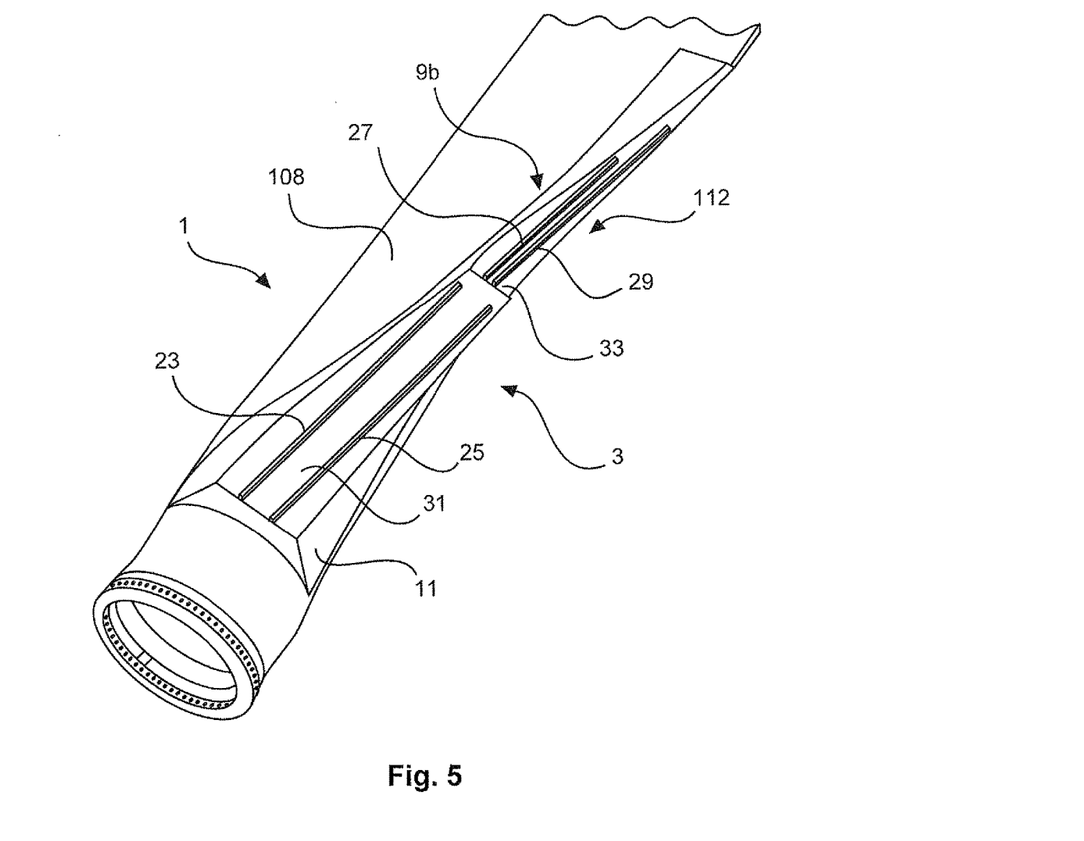
FIG. 5 shows a portion of the rotor blade from FIGS. 2 to 4 in a fourth mounted position.

Consideration of FIGS. 2 to 5 also provides information about fitting and removing the head segments of the rear box section 112 to and from the rotor blade 108. In the transition from the condition shown in FIG. 2 to the condition shown in FIG. 3, firstly the head segment 13 closest to the rotor blade root 21 is uncoupled from the foot segment 11 by the head segment 13 being pushed off along the rails 23, 25 after unlocking (not shown) has been effected. Then, as shown in FIG. 4, the second head segment 5 is pushed off the foot segment 11 along the second sub-division plane 19 and the rails 27, 29. Finally FIG. 5 shows the foot segment 11 of the rear box section 112 on the rotor blade 108 with the removed (or not yet fitted) head segments 13, 15. A procedure in a similar fashion but in reverse is performed for fitting the head segments, for example at the location of erection of the wind power installation, and firstly the head segment 15 is pushed on. Subsequently the head segment 13 is pushed on and optionally secured.

FIGS. 6 to 9 show a rear box section 112 for a rotor blade 108 according to a second embodiment of this invention. The rear box section 112 of FIGS. 6 to 9 is of substantially the same configuration as that shown in FIGS. 2 to 5. Distinguishing features of substance are discussed hereinafter. The foot segment 11 of the rear box section 112 in FIGS. 6 to 9 has a single continuous sub-division plane 37. A total of three head segments 13, 15, 35 are associated with that sub-division plane. The head segments 13, 15, 35 each have a part of the trailing edge 5 of the rear box section 112. The sub-division plane 37 extends from the suction side 1 to the pressure side 3, as also applies in the embodiment in FIGS. 2 to 5 for the sub-division planes 17, 19 there. The rear box section 112 of FIGS. 6 to 9 is shown without an end cover, permitting a view on to the interior of the rear box section. The foot segment 11 has a substantially continuous leg 31, on which a plurality of rails which are respectively guided in parallel paired relationship is arranged (see FIG. 9). The head segments 13, 15, 35 each have a leg, a leg 39 being shown in relation to the first head segment, on which there is respectively arranged a pair of rails 41, 43, on the side towards the foot segment 11. The rails 23, 25 are coupled to the respectively corresponding rails 41, 43 for the first head segment 13 in the position shown in FIG. 6 and are in positively locking engagement. See in that respect also FIGS. 10 and 11. In regard to the edge configurations 9a,9b on the connecting side of the rear box section 112, attention is directed to the foregoing description relating to the first embodiment.

Figure 6:
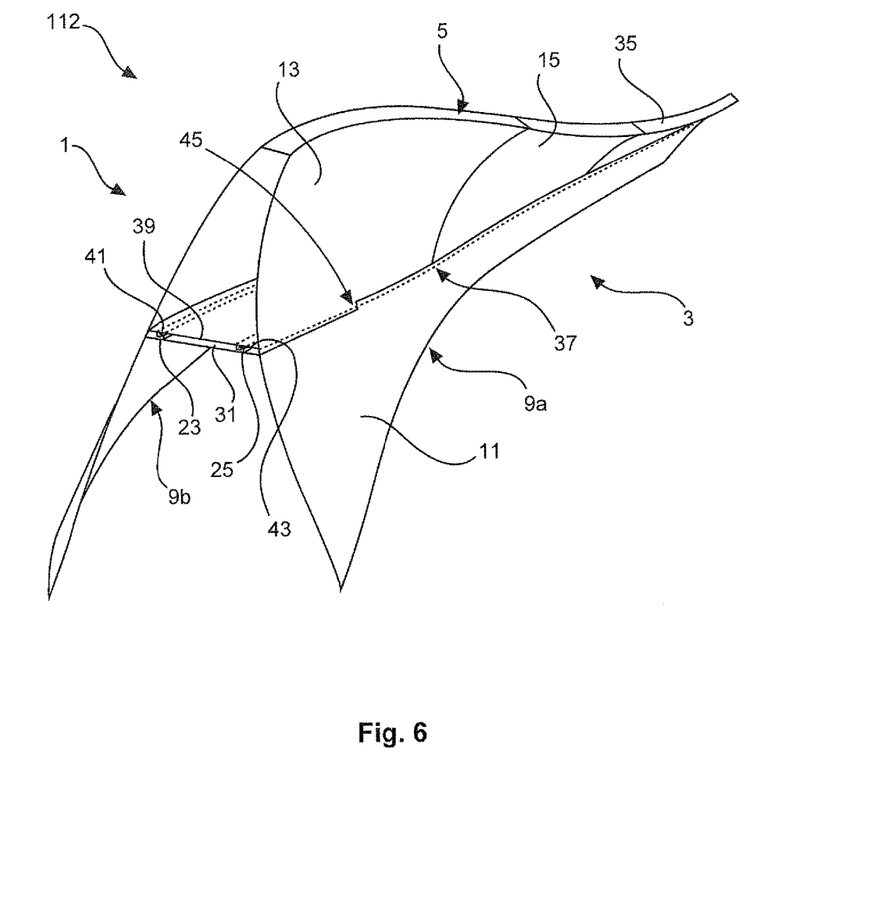
FIG. 6 shows a rear box section for each rotor blade according to a second embodiment of the invention in a first mounted position.
Figure 7:
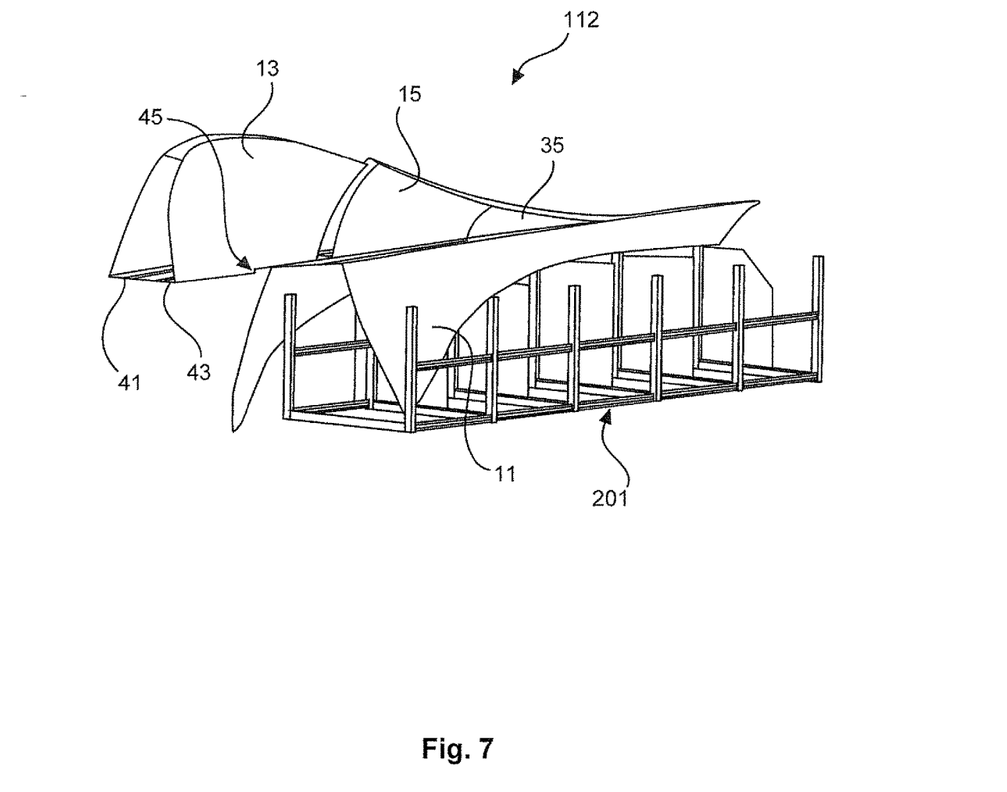
FIG. 7 shows the rear box section of FIG. 6 in a second mounted position.
Figure 8:
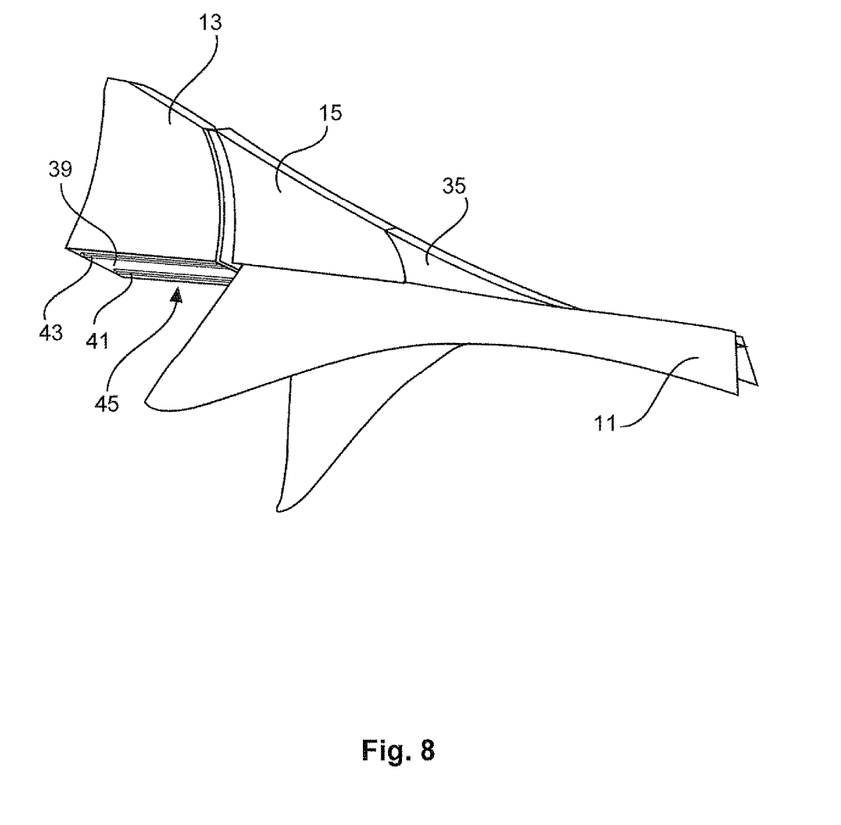
FIG. 8 shows the rear box section in the mounted position of FIG. 7 in another orientation.
Figure 9:
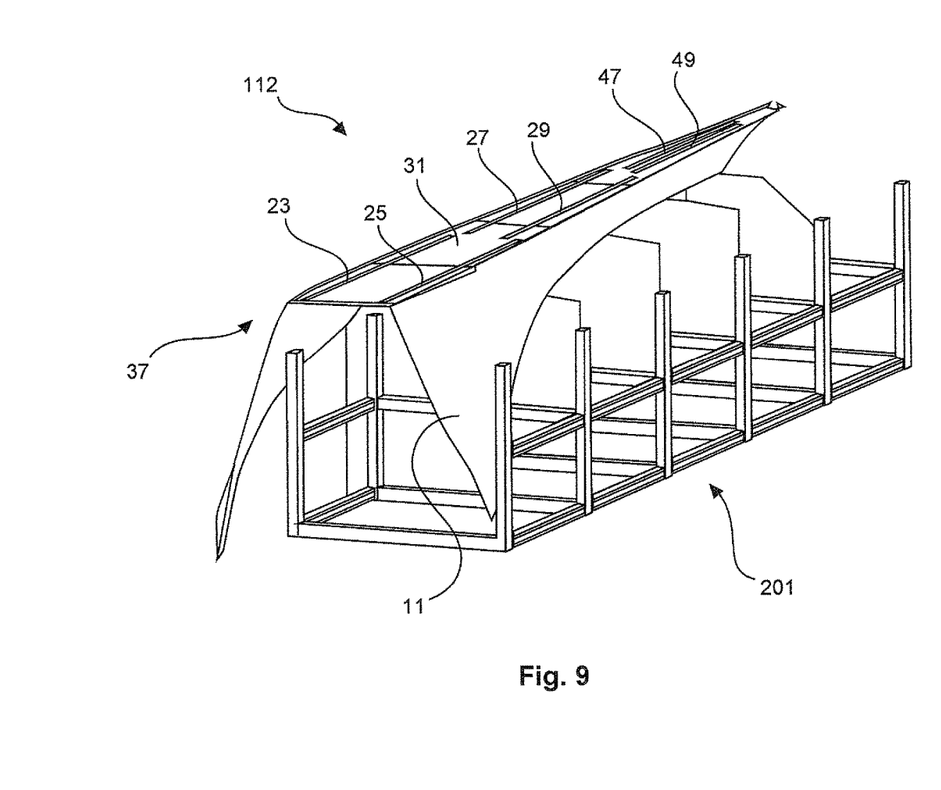
FIG. 9 shows a foot segment for a rear box section according to the second embodiment of the invention.

In FIGS. 7 and 9 the rear box section 112 in accordance with the second embodiment, is shown as being supported on a support frame structure 201. The support frame structure 201 is omitted in FIG. 8, as also in FIG. 6, which serves for illustrative purposes.

FIG. 7 shows how the head segments 13, 15 and 35 are respectively brought out of engagement with the rails respectively associated therewith on the foot segment 11 (see also FIG. 9). In regard to the first head segment, the rails 41, 43 are indicated by way of example.

A similar fitting and removal position is also shown in FIG. 8 where however a better view on to the underside of the leg 39 of the head segment 13 is possible, and the rails 41, 43 can be better seen.

As can also be seen from FIGS. 6 and 7 the head segment 13 has a step 45 on the pressure and suction sides of the surfaces of the rear box section 112. At the same location (with respect to the mounted condition of the head segment 13 on the foot segment 11) the foot segment 11 has a step of corresponding configuration. The outer surface of the head segment 13 overlaps as far as the region of the step 45 the subjacent surface of the foot segment 11 to ensure sealing integrity of the surface transition between the head segment 13 and the foot segment 11. The step 45 is provided at a point at which the width of the head segment 13 and corresponding thereto the width of the leg 31 is at a maximum. In the region between the step 45 and the hub-side end of the head segment 13 the surface of the head segment 13 in the mounted condition overlaps the surface of the foot segment 11 while in the region between the step 45 and the adjacent head segment 15 the surface of the foot segment 11 overlaps the surface of the head segment 13. That prevents damage to the lower edge of the head segment when fitting or removing the head segment 13.

It will be seen from FIG. 9 that the leg 31 is composed of a plurality of segments in the sub-division plane 37. A total of six rails are respectively arranged in paired relationship on the foot segment 11 of the rear box section 112, respectively spanning over at least one of the segments of the leg 31. The rails 23, 25 are associated with corresponding rails of the first head segment 13 (see FIGS. 6 to 8). The rails 27, 29 which are arranged at a smaller spacing from each other than the rails 23, 25 are associated with corresponding rails of the second head segment 15. The rails 47, 48 arranged at a smaller spacing from each other than the rails 27, 29 are associated with corresponding rails of the head segment 35. The spacings are preferably so selected that the head segment 35 can be coupled to the foot segment 11 without coming into contact with the rails 27, 29 and 23, 25, and preferably also in such a way that the head segment 15 can be coupled to the foot segment 11 without coming into contact with the rails 23, 25.

Figure 10:
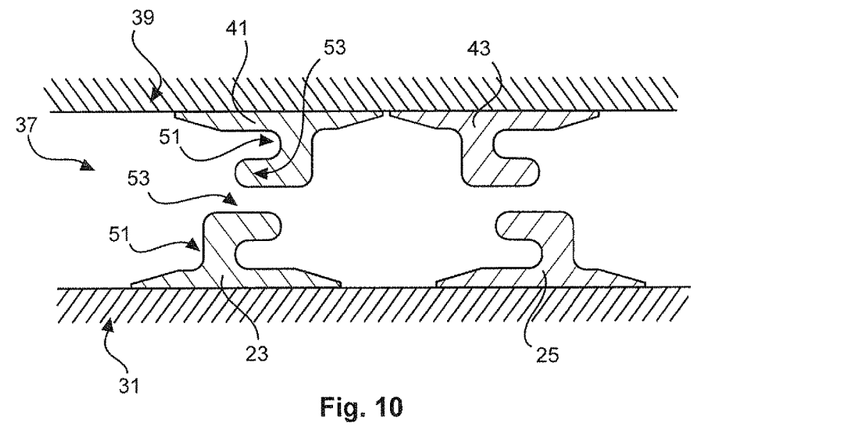
FIG. 10 shows a detail view of a foot segment and a head segment of the rear box section according to the invention in the uncoupled condition.
Figure 11:
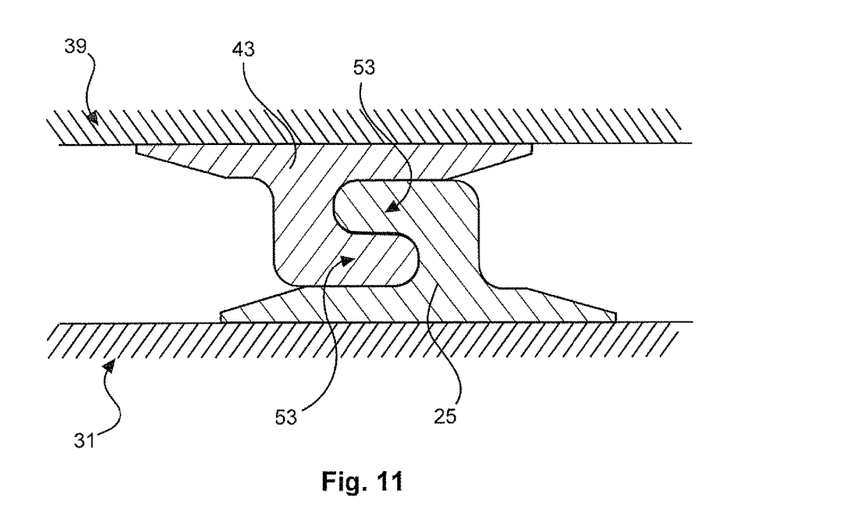
FIG. 11 shows a detail view of a foot segment and a head segment for a rear box section according to the invention in the coupled condition.

FIGS. 10 and 11 show the arrangement of the rails on the foot segment and a corresponding head segment according to a preferred embodiment. In this embodiment the rails are all identical. Positively locking interengagement which makes it possible for the transverse forces to be carried in all directions is achieved solely by a mirror-reversed arrangement of the rails. The Figures show in detail a cross-section through the rear box section 112 of the second embodiment. Nonetheless the arrangement of the corresponding rails of an identical configuration is also to be similarly adopted for the first embodiment. The rails 23, 25 are disposed on the leg 31 of the foot segment 11 (not shown). The rails each have a portion 51 extending at a right angle from the leg and a portion 53 oriented substantially parallel to the leg 31. That forms a substantially L-shaped profile. The portions 53 oriented parallel to the leg 31 face towards each other. Arranged on the leg 31 of the first head segment 13 (not shown) are two corresponding rails 41, 43. Unlike the rails 23, 25 arranged on the leg 31 of the foot segment the portions 53 oriented parallel to the leg 39 face away from each other. The rails are shown out of engagement in FIG. 10.

FIG. 11 shows a simple diagrammatic view showing the principle for one of the two pairs of rails shown in FIG. 10, illustrating the engagement situation. The horizontal portions 53 of the rail 25 and the rail 43 engage one behind the other, whereby the force components perpendicular to the two legs 31, 39 are respectively carried. The force component parallel to the legs 31, 39 is carried in one respective direction by the rail 25 and 41 and in the other direction by the rail 23 and 43.

Alternative configurations to the L-shaped profile of the rails involve for example a C-shaped profile. As an alternative to the illustrated use of identical rails, the configuration of a dovetail-shaped or trapezoidal profile with a male part and a female counterpart is still preferred. The latter also permits the use of a single-rail system, that is to say only one rail per head segment and even a continuous rail on the foot segment, and each with that corresponding rail on the one or more head segments.

Figure 12:
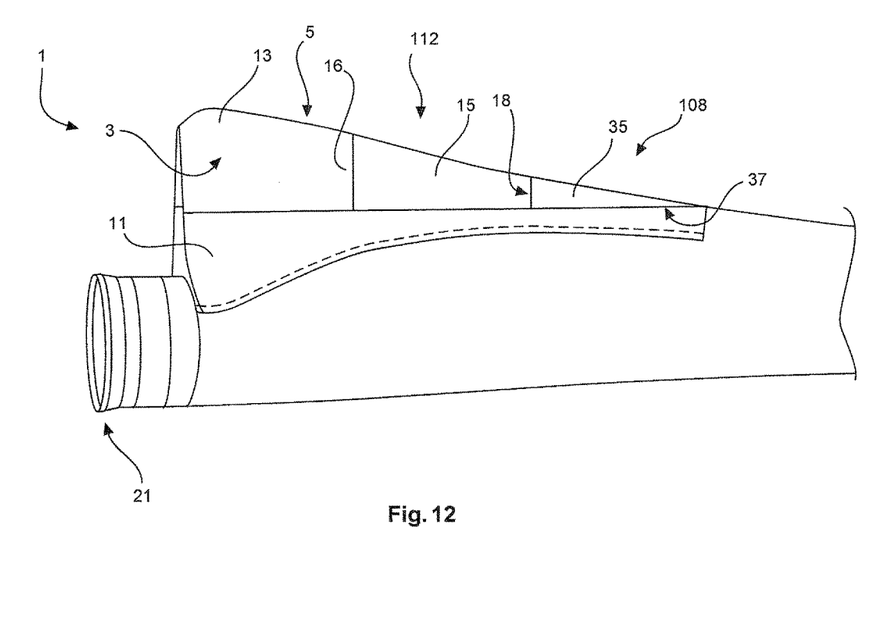
FIG. 12 shows a portion of a rotor blade according to the invention with a rear box section according to a third embodiment of the invention.

FIG. 12 shows a rotor blade 108 with a rear box section 112 in accordance with a third embodiment. The rotor blade 108 and the rear box section 112 have structural similarities to the first and second embodiments of the present invention. In regard to identical references, attention is directed in this respect to the foregoing description. The rear box section 112 of the rotor blade 108 of FIG. 12 has a single foot segment 11 which is coupled along a continuous sub-division plane 37 to a plurality of, in this case three, head segments 13, 15, 35. The head segments 13, 15, 35 are arranged in mutually adjacent relationship and bear against each other at sub-division planes 16, 18. In that way the continuous trailing edge 5 is formed between the suction side and the pressure side 1, 3 of the rear box section 112.

Figure 13:
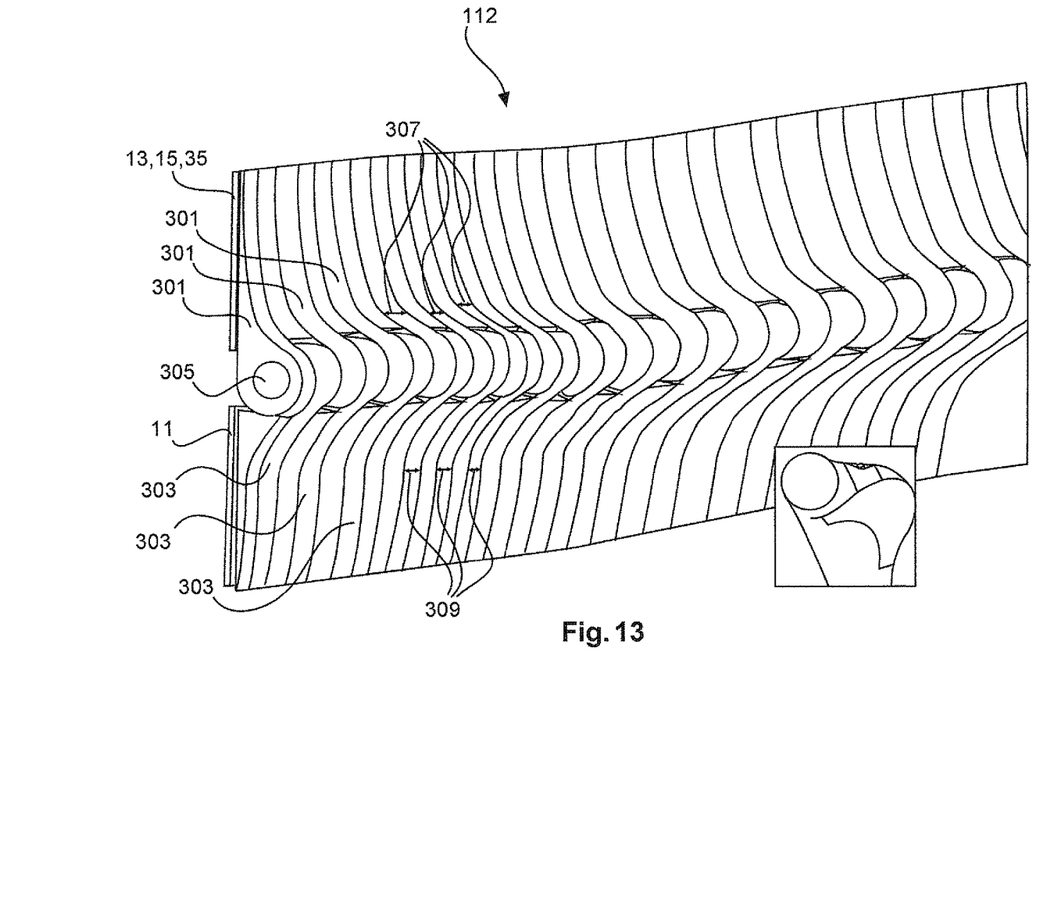
FIG. 13 shows a detail view of the rear box section of FIG. 12.

The kind of positively locking coupling of the head segments to the foot segments in FIG. 12 is shown more clearly in FIG. 13. As can be seen from the overview at bottom right in FIG. 13, a hinge-like coupling is provided at the inside of the rear box section 112. The foot segment 11 has a plurality of projections 303 which respectively have a first recess. The head segment 13 or the head segments 13, 15, 35 have a plurality of second projections 301 which each have a second recess. The first projections 303 of the foot segment 11 are respectively spaced from each other at a spacing 309. The spacings 309 are respectively adapted to the width of the second projections 301 of the head segment or segments 13, 15, 35. It is to be concluded therefrom that the spacings do not all have to be the same but can each differ from each other as long as they are dimensioned in accordance with the oppositely disposed corresponding projections 301. The second projections 301 of the head segment or segments 13, 15, 35 are respectively spaced from each other at a spacing 307 for which the same applies as for the spacing in respect of the projections 303 of the foot segment 11.

To achieve a positively locking coupling between the foot segment 11 and the head segment or segments 13, 15, 35 the projections 301, 303 are oriented in mutual alignment. As soon as alignment has been effected an elongate body 305 which in principle forms the rod of a hinge is introduced into the first and second recesses until it extends through preferably all first and second recesses. In that embodiment in which the recesses are not strictly coaxial but follow a curved path corresponding for example to the contour of the rotor blade, introduction of the elongate body 305 into the first and second recesses is guaranteed by sufficient elasticity of the elongate body.

The projections 301, 303 which are in the form of straps are preferably fixed to the inside of the edges of the foot segment 11 or the head segments 13, 15, 35, in particular by means of gluing.

Figure 14:
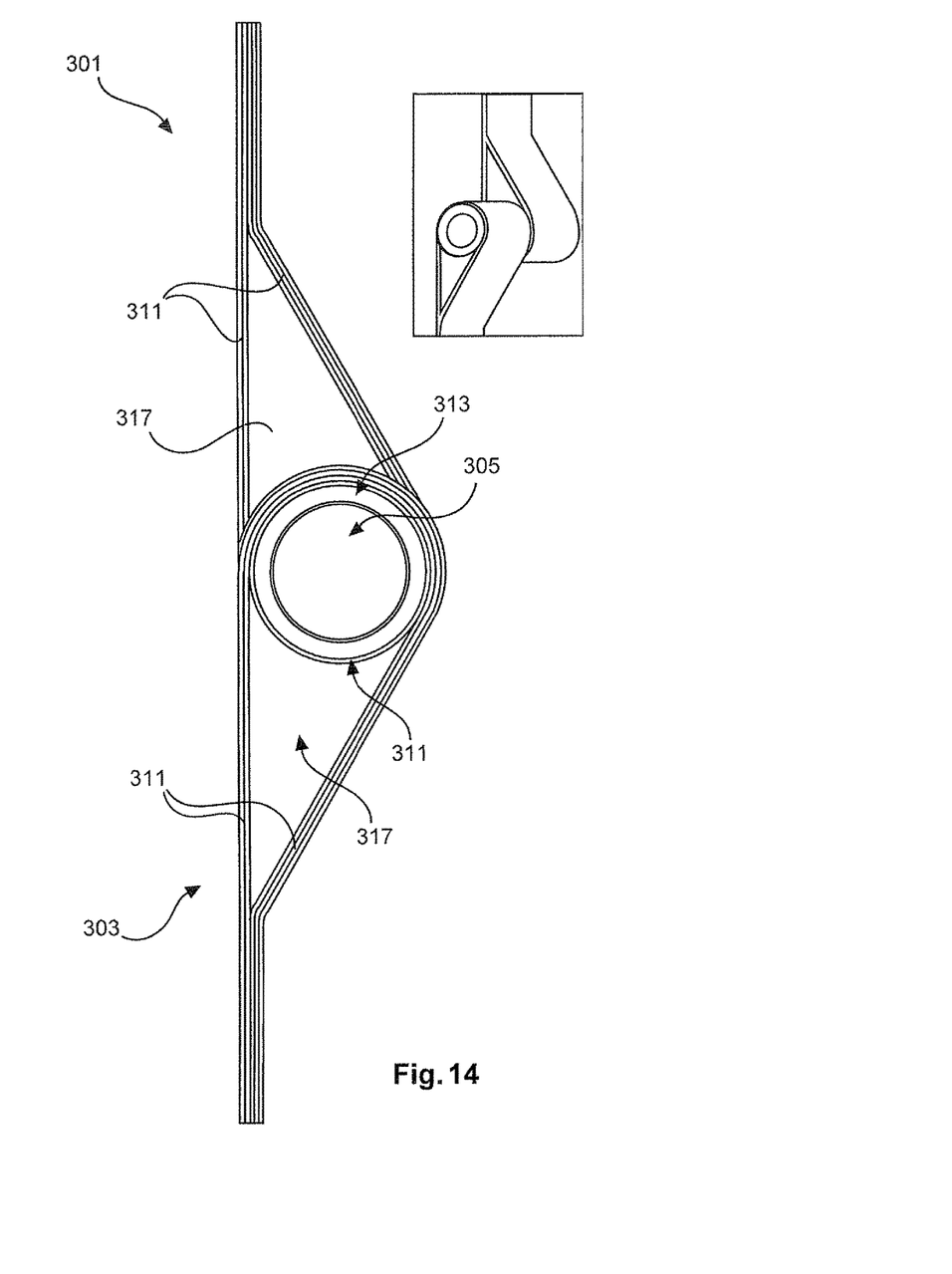
FIG. 14 shows a diagrammatic view of a part of the rear box section as shown in FIGS. 12 and 13.

The arrangement and precise configuration of the projections is diagrammatically shown in FIG. 14. FIG. 14 shows a diagrammatic plan view, as will be clear from the overview at top right in FIG. 14, of the coupling condition between two adjacent projections 301,303. The first and second projections 303,301 are formed by an externally disposed fabric sheet layer 311 comprising fiber-reinforced material, in particular glass fiber-reinforced plastic. The amount of layers used depends on the expected loading on the straps or projections. A respective wedge 317 comprising a foam is arranged in the interior of the sheet layers 311. Provided at a respective end of the projections 301,303 is a coupling region in which an arcuate loop of the fabric sheet is formed.

Arranged within that loop, as shown in FIG. 14, is a high cylindrical wall of plastic. The elongate body 305 is accommodated preferably without play within that wall. To improve the transmission of the pressure forces to the projections the shock-absorbing high cylindrical wall 313 is enclosed by a layer 315 of fiber-reinforced material, preferably glass fiber-reinforced plastic.

A particular advantage of the positively locking coupling shown in FIGS. 12 to 14 is that the coupling means formed by the projections 301, 303 can be arranged directly at the inside wall on the suction side or the pressure side 1, 3 of the rear box section 112 or the rotor blade 108 respectively without legs having to be separately pulled into the interior of the rear box section 112 for coupling purposes. The possibility of providing further transverse struts and legs for additional stiffening is still retained in that case. The coupling means are protected on the inside of the rear box section from wind acting thereon and do not influence the flow profile. In addition they permit quick and easy assembly with accurate positioning of the parts relative to each other.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rear box section for mounting in a region of a rotor blade root of a rotor blade of a wind power installation, the rear box section comprising:
   a head segment having a pressure-side surface, a suction side surface, a trailing edge separating the pressure-side and suction-side surfaces, and a first connecting side opposing the trailing edge, wherein the head segment has a plurality of spaced projections, each having a first recess; and
   a foot segment having a second connecting side that is adapted for mounting to and adhering to a corresponding connecting surface of the rotor blade in the region of the rotor blade root, the foot segment having a third connecting side configured to be coupled to the first connecting side of the first head segment, wherein the foot segment has a plurality of spaced projections, each having a second recess, the first and second recesses being arranged to align with each other and to be used to fixedly secure the head segment to the foot segment, wherein the foot segment, when mounted to the rotor blade, causes the rotor blade and the foot segment to have a combined cross-section width that is substantially the same as a lamest cross-section width of the rotor blade without the foot segment.

2. The rear box section according to claim 1 wherein the head segment includes a plurality of head segments, and the third connecting side of the foot segment has for each of the plurality of head segments a separate sub-division plane at which each of plurality of the head segments can be coupled to the foot segment.

3. The rear box section according to claim 2 wherein the sub-division planes are so arranged that the maximum profile width of the rotor blade is in a region of 4 m or less when the foot segment is connected to the rotor blade.

4. The rear box section according to claim 2 wherein at least one of the foot segment and the head segment have in a region of the sub-division, a respective leg extending from the pressure-side surface to the suction-side surface.

5. The rear box section according to claim 1 wherein the head segment includes a plurality of head segments, and the second connecting side of the foot segment has for the plurality of head segments a continuous sub-division plane at which the respective head segments can be coupled to the foot segment.

6. The rear box section according to claim 1 wherein the foot segment and the head segment are configured to be coupled together in a positively locking relationship.

7. The rear box section according to claim 1 further comprising an elongate body that has a cross-section that is adapted to a cross-section of the first and second recesses and configured be introduced into the plurality of first and second recesses when the projections of the foot segment are oriented with the projections of the head segment.

8. The rear box section according to claim 7 wherein the elongate body extends in a mounted condition through the plurality of the projections of the foot segment and the head segment.

9. The rear box section according to claim 1 wherein the elongate body comprises at least one of a fiber composite material and glass fiber-reinforced plastic.

10. The rear box section according to claim 1 wherein the plurality of projections of the foot segment and of the head segment are arranged along a curved path.

11. The rear box section according to claim 10 wherein the curvature of the path corresponds to the contour configuration of the rotor blade.

12. The rear box section according to claim 1 wherein sidewalls of the first and second recesses are at least partially lined with a plastic material.

13. The rear box section according to claim 1 wherein the projections are straps and have a fabric comprising two or more fiber composite material layers.

14. The rear box section according to claim 1 wherein at least two or more head segments are associated with the foot segment.

15. The rear box section according to claim 1 wherein near the first connecting side, both the pressure-side surface and the suction-side surface are respectively delimited by an edge having a respective edge configuration that is adapted to the contour of the connecting surface of a rotor blade.

16. The rear box section according to claim 1 further comprising one or more regions for applying bonding agents are located in an interior of the rear box section to secure the rear box section to the region of the rotor blade root of the rotor blade.

17. The rear box section according to claim 1 further comprising arresting means for selectively locking or releasing a relative position between the foot segment and the head segment in the coupled condition.

18. A rotor blade for a wind power instillation, comprising:
   a supporting portion,
   a rotor blade root embraced by the supporting portion for mounting to a rotor of the wind power installation,
   a pressure-side blade surface,
   a suction-side blade surface,
   a trailing edge separating the pressure-side and the suction-side surfaces,
   a connecting surface, and
   a rear box section that includes:
      a head segment having a pressure-side surface, a suction-side surface, a trailing edge separating the pressure-side and suction-side surfaces, and a first connecting side opposing the trailing edge; and
      a foot segment having a second connecting side that is secured to the connecting surface of the rotor blade at a region of the rotor blade root by a bonding material, the foot segment having a third connecting side coupled to the first connecting side of the first head segment, the head segment coupled to the foot segment, wherein the foot segment causes the rotor blade and the foot segment to have a combined cross-section width that is substantially the same as a largest cross-section width of the rotor blade without the foot segment.

19. The rotor blade according to claim 18 wherein the rear box section includes a plurality of head segments, wherein the foot segment is coupled to the plurality of head segments.

20. A wind power installation comprising:
   a pylon;
   a pod;
   a rotor; and
   at least one rotor blade according to claim 18 connected to the rotor.

21. The rotor blade according to claim 18, wherein:
   the head segment has a plurality of spaced projections, each having a first recess; and
   the foot segment has a plurality of spaced projections, each having a second recess, the first and second recesses being arranged to align with each other and to be used to fixedly secure the head segment to the foot segment.

22. The rotor blade according to claim 18, wherein the connecting surface of the rotor blade is located on the pressure-side blade surface and the suction-side blade surface.

* * * * *